United States Patent Office 3,655,626
Patented Apr. 11, 1972

3,655,626
INTERPOLYCARBONATES FROM 9,10 - BIS (HYDROXYMETHYL) - S - OCTAHYDROANTHRACENE-BIS (ALKYL OR ARYL CARBONATES)
Marjan Kolobielski, Baltimore, Md., assignor to United States Steel Corporation
No Drawing. Filed Oct. 2, 1968, Ser. No. 764,637
Int. Cl. C08g *17/13*
U.S. Cl. 260—77.5
5 Claims

ABSTRACT OF THE DISCLOSURE

Linear, highly polymeric interpolycarbonates of 9,10-bis (hydroxymethyl-s-octahydroanthracene-bis (alkyl or aryl carbonate) copolymerized with a bis (carbonate) of a polyoxyethylene glycol of s-octahydroanthracene or with a bis (carbonate) of an aliphatic glycol. The interpolycarbonates melt between about 200° and 300° C. and can be fabricated into fibers, extrusions or molded articles by ordinary commercial means.

BACKGROUND OF THE INVENTION (1) Field of the invention

This invention relates to interpolycarbonates prepared by the co-condensation in the presence of an ester-interchange catalyst of 9,10-bis (hydroxymethyl)-s-octahydroanthracene-bis (alkyl or aryl carbonate) and another bis (carbonate) monomer. The other monomer is preferably a bis (carbonate) of a polyoxyethylene glycol of s-octahydroanthracene or a bis (carbonate) of an aliphatic glycol.

(2) Description of the prior art

U.S. Pat. No. 3,396,148, issued Aug. 6, 1968, discloses 9,10-bis (hydroxymethyl) - s - octahydroanthracene - bis (alkyl or aryl carbonate) and polycarbonates thereof. The latter can be used to make fibers or molded articles. Because of their high melting points, usually in excess of 300° C., a special technique must be used to fabricate commercial articles. The technique is similar to that used in making molded articles, for example, from Teflon resin. It resembles powder metallurgy, in that the resin powder must be compacted to the desired shape. U.S. Pat. No. 3,244,674, issued Apr. 5, 1966, discloses bis (carbonates) of a polyoxyethylene glycol of s-octahydroanthracene and polycarbonates thereof. The latter having melting points approximating 100° C. are suitable for making coatings, paints or adhesives. U.S. Pat. No. 2,789,968, issued Apr. 23, 1957, discloses bis (carbonates) of an aliphatic glycol and polycarbonates thereof. The latter having melting points approximating or even less than about 100° C. are suitable for making waxes, coatings and films. The above-described polycarbonates are at the two extremes regarding their melting points.

SUMMARY OF THE INVENTION

My invention provides linear, highly polymeric interpolycarbonates prepared by the co-condensation of two bis (carbonate) monomers in the presence of an ester-interchange condensing agent or catalyst. The primary bis (carbonate) is 9,10-bis (hydroxymethyl)-s-octahydroanthracene-bis (alkyl or aryl carbonate). A copolymerizable bis (carbonate) may be one of a polyoxyethylene glycol of s-octahydroanthracene or one of an aliphatic glycol.

More particularly, my interpolycarbonate comprises a co-condensation product from a mixture of at least about 20 mole percent of the above primary bis (carbonate) and between about 10 and 80 mole percent and between about 10 and 65 mole percent of said respective copolymerizable bis (carbonates). It is evident that in any mixture more primary bis (carbonate) should be added to arrive at 100 mole percent while maintaining the said range of a chosen copolymerizable bis (carbonate).

When operating within a defined mole-percent range, a resulting novel interpolycarbonate comprises a long-chain molecule of two different monomer units joined together in an irregular sequence. The unexpected result of such a combination is a polymer with new and unpredictable properties. It has been found, however, that the products have high thermal stability yet melt between about 200° and 300° C. The products may be converted into fibers by the usual melt- or solution-spinning methods. Molded articles may be made therefrom by commercial blow, injection and compression-molding methods. Tubes, rods and other shapes may be easily extruded, for example, as electrical insulating materials. Fibers, extrusions and molded articles may be made without fear of decomposition due to high melting points as is the case with some of the polycarbonates referred to above. Other polycarbonates referred to above having melting points too low for fabrication into fibers, extrusions and molded articles are upgraded for such use.

The advantages of my interpolycarbonates over prior art polycarbonates include:
(1) High thermal stability.
(2) Process flexibility to vary the melting point of an interpolycarbonate to between about 200° and 300° C.
(3) Interpolycarbonates which can be fabricated into fibers, extrusions or molded articles by ordinary commercial means.

DESCRIPTION OF A PREFERRED EMBODIMENT

The novel interpolycarbonates of this invention may be prepared by a process which comprises co-condensing a mixture consisting of at least about 20 mole percent of a primary bis (carbonate) monomer such as 9,10-bis (hydroxymethyl) - s - octahydroanthracene - bis (alkyl or aryl carbonate) having the formula:

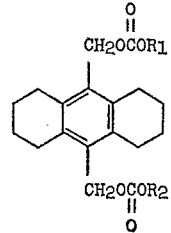

together with at least about 10 mole percent of a copolymerizable bis (carbonate) monomer of an aliphatic glycol having the formula:

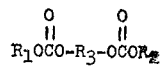

or together with at least about 10 mole percent of a copolymerizable bis (carbonate) monomer of a polyoxymethylene glycol of s-octahydroanthracene having the formula:

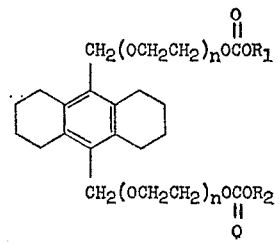

In the above formulas $R_1$ and $R_2$ each represents a radical selected from the group consisting of lower alkyl radicals containing from 1 to 4 carbon atoms and aryl radicals of the benzene series containing from 6 to 8 carbon atoms. $R_3$ represents an alkylene radical containing from 4 to 10 carbon atoms and $n$ is an integer from 1 to 4.

The co-condensation reaction is carried out at between about 200° and 300° C., preferably between about 200° and 260° C. The reaction is carried out at the high portion of the range where the desired interpolycarbonate has a high melting point and the reaction mixture must be maintained in a liquid phase. The reaction is carried out in the presence of an ester-interchange catalyst or condensing agent. Catalysts may be chosen from titanium alkoxides, alkali metal alkoxides, such as sodium alkoxides and alkali metal hydrides, such as, sodium hydride. A preferred group is titanium alkoxides, especially titanium tetrabutoxide. The condensation may be carried out at any of the usual reaction pressures. It is preferred to use two pressure stages, namely, initially, at about atmospheric pressure and subsequently at sub-atmospheric pressure, preferably, at a pressure less than about one millimeter mercury absolute. The reaction may be carried out in an inert atmosphere, preferably, by bubbling any of the usual inert gases through the reaction mixture. The reaction times can vary widely, for example, in the preferred two-stage process, each stage may be completed at between about one half hour and four hours.

The products of this invention are linear highly polymeric interpolycarbonates, comprising at least about 20 mole percent of first recurring or repeating units, having the formula:

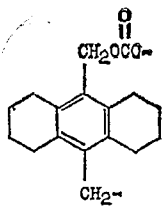

The units are connected by ester linkages to an identical unit or to a second repeating unit copolymerized therewith. In other words, the first units are interspersed with at least about 10 mole percent of said second repeating units, the latter being chosen from the group having the formula:

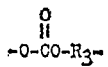

or having the formula:

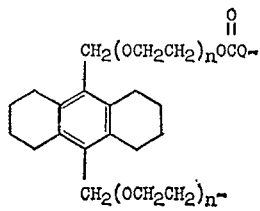

Both ends of each interpolycarbonate molecule are terminated by an

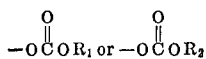

group or radical. $R_1$, $R_2$, $R_3$ and $n$ have the meanings hereinabove described.

The proportions of the primary bis (carbonate) monomers and of the copolymerizable bis (carbonate) monomers employed in the co-condensation reaction vary and depend on the purpose for which the resulting interpolycarbonate is being prepared. It has been found that the greater the amount used of a copolymerizable bis (carbonate) monomer, the lower is the melting point of the resulting interpolycarbonate. It has been found also that to obtain an interpolycarbonate melting in the range between about 200° and 300° C. when the monomer is a described bis (carbonate) of an aliphatic glycol, the monomer and the second repeating units derived therefrom should be used in a range between about 10 and 65 mole percent, preferably between about 20 and 60 mole percent. When the monomer is a bis (carbonate) of a polyoxyethylene glycol of s-octahydroanthracene, the monomer and the second repeating units derived therefrom should be used in a range between about 10 and 80 mole percent, preferably between about 20 and 50 mole percent. The above described primary bis (carbonate) monomers and the first repeating units derived therefrom should be used to at least about 20 mole percent. The amount thereof in any mixture should be sufficient to total about 100 mole percent for the mixture, while maintaining a chosen copolymerizable bis (carbonate) within the stated range thereof. Said respective range for a copolymerizable bis (carbonate) has been found to be quite critical. If less than about 10 mole percent is used, the product may have too high a melting point and may not lend itself to fabrication by the usual commercial methods. If the high side of a range is exceeded, the product may have too low a melting point, may become waxy or may result in a relatively poor molded product when fabricated.

A complete understanding of the invention may be obtained from the following typical examples of process showing how the interpolycarbonates are made and some of the properties thereof.

EXAMPLE 1

A 9.36 g. (80 mole percent) sample of 9,10-bis (hydroxymethyl)-s-octahydroanthracene-bis (ethylcarbonate) was mixed with 2.87 g. (20 mole percent) of copolymerizable 9,10 - bis($\beta$-hydroxyethoxymethyl)-s-octahydroanthracene-bis (ethylcarbonate) and with 0.3 cc. of a catalyst solution prepared by dissolving 2.0 cc. of titanium tetrabutoxide in 18 cc. of n-butyl alcohol. The reaction mixture was heated at 250°–255° C. for an hour. During this period, the ethyl carbonate which was formed distilled from the reaction flask. A vacuum of 0.5 mm. Hg absolute was then applied and the heating continued for another hour. During the heating periods, a slow stream of dry oxygen-free nitrogen was passed through the charge. Upon cooling, the resulting interpolycarbonate was a light-colored polymer melting at 295°–300° C.

EXAMPLE 2

Example 1 was repeated except that about 50 mole percent each of the respective materials were mixed. The reaction mixture, including catalyst, was heated in an inert atmosphere at 245°–250° C., first for an hour at atmospheric pressure and then at 0.5 mm. Hg absolute pressure for 45 minutes. The interpolycarbonate product was a light-colored, hard and tough polymer melting at 285°–290° C.

EXAMPLE 3

Example 1 was repeated, except that 5.0 g. (40 mole percent) of 9,10-bis (hydroxymethyl)-s-octahydroanthracene-bis (ethylcarbonate), 5.0 g. (60 mole percent) of 1,5-pentanediol-bis (ethyl carbonate) and catalyst were mixed heated in the same inert atmosphere at 225°–230° C. for an hour and then at 250° C. for 1.5 hours more. A vacuum of 0.3–0.4 mm. Hg absolute was applied and the heating continued at 250° C. for 2 hours and 20 minutes longer. The product was a tough light-colored polymer, melting at 290°–293° C. A sample of powdered product was compression molded into a disc by applying pressure of 8000 p.s.i. at 230–240° C.

EXAMPLE 4

Example 3 was repeated, except that the respective portions were 3.0 g. (22 mole percent) and 7.0 g. (78 mole percent). These portions and catalyst were mixed, heated in the same inert atmosphere at 230°–240° C. for 2.5 hours at atmospheric pressure and then at 0.3–0.4 mm. Hg absolute pressure for 4 hours more. Upon cooling, the resulting interpolycarbonate was a low-melting, waxy, light-colored resin.

Examples 1, 2 and 3 illustrate the production of interpolycarbonates having relatively high melting points yet capable of being fabricated into the above-described useful products by the usual commercial means. In Example 4, 78 mole percent of a bis (carbonate) of an aliphatic glycol was used. This is outside the critical 10–65 mole percent range and resulted in the production of a low-melting, waxy product that could not be fabricated into a useful molded product.

Although I have disclosed herein the preferred practice of my invention, I intend to cover as well any change or modification therein which may be made without departing from the spirit and scope of the invention.

I claim:

1. Linear, highly polymeric interpolycarbonates comprising at least about 20 mole percent of first repeating units having the formula:

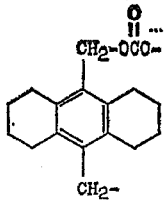

where the said first units are interspersed with second repeating units copolymerized therewith, said second units being chosen from the group consisting of (A) and (B) wherein (A) has the formula:

and (B) has the formula:

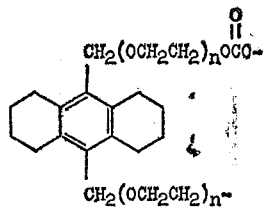

units (A) being present in an amount between about 10 and 65 mole percent and units (B) being present in an amount between about 10 and 80 mole percent, the respective ends of each interpolycarbonate molecule consisting of a radical chosen from the group consisting of

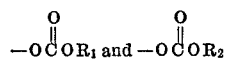

where $R_1$ and $R_2$ are chosen from the group consisting of lower alkyl radicals having from 1 to 4 carbon atoms, $R_3$ is an alkylene radical having from 4 to 10 carbon atoms, and $n$ is an integer from 1 to 4.

2. An interpolycarbonate as defined in claim 1 where said second units are present in an amount between about 10 and 65 mole percent and have the formula:

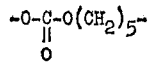

3. An interpolycarbonate as defined in claim 1 wherein said second repeating units are present in an amount between about 10 and 80 mole percent and have the formula:

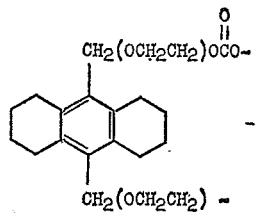

4. An interpolycarbonate as defined in claim 1 wherein said second repeating units are present in an amount between about 20 and 60 mole percent and have the formula:

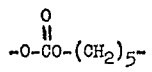

5. An interpolycarbonate as defined in claim 1 wherein said second repeating units are present in an amount between about 20 and 50 mole percent and have the formula:

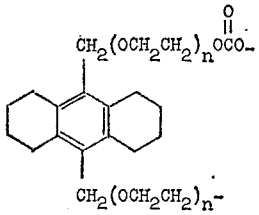

References Cited

UNITED STATES PATENTS

| | | | |
|---|---|---|---|
| 2,789,966 | 4/1957 | Reynolds et al. | 260—77.5 |
| 2,789,967 | 4/1957 | Reynolds et al. | 260—77.5 |
| 3,244,674 | 4/1966 | Kolobielski | 260—77.5 |
| 3,396,148 | 8/1968 | Kolobielski | 260—77.5 |

SAMUEL H. BLECH, Primary Examiner

U.S. Cl. X.R.

260—463